(12) United States Patent
Underhill

(10) Patent No.: US 6,321,849 B1
(45) Date of Patent: Nov. 27, 2001

(54) APPARATUS FOR COLLECTING/DESTROYING AERATION CORES

(76) Inventor: Kenneth R. Underhill, 219 Miller St., Strasburg, PA (US) 17579

(*) Notice: Subject to any disclaimer, the term of this patent is extended or adjusted under 35 U.S.C. 154(b) by 0 days.

(21) Appl. No.: 09/466,743

(22) Filed: Dec. 17, 1999

Related U.S. Application Data

(60) Provisional application No. 60/113,213, filed on Dec. 22, 1998.

(51) Int. Cl.[7] .............................. B65G 67/02; A01B 45/02
(52) U.S. Cl. ................................ 172/22; 172/32; 172/33; 198/311; 198/317; 198/510.1; 198/52; 414/501
(58) Field of Search ................................. 172/21, 22, 33, 172/32; 56/16.4 R, 16.5, 16.6, 228; 198/312, 311, 317, 520, 510.1; 414/501, 486, 487

(56) References Cited

U.S. PATENT DOCUMENTS

| | | | |
|---|---|---|---|
| 2,243,650 | 5/1941 | Poll | 172/33 |
| 5,002,453 | 3/1991 | Shigehisa | 414/502 |
| 5,069,293 | 12/1991 | St. Romain | 172/22 |
| 5,178,221 | 1/1993 | Hamawaki | 172/22 |
| 5,423,386 | 6/1995 | Lapearous | 172/22 |
| 5,816,336 | 10/1998 | Underhill | 172/22 |

Primary Examiner—Christopher J. Novosad

(57) ABSTRACT

A core harvesting machine that can be mounted to the rear of a conventional aeration machine to receive green cores directly from the aeration machine without having the cores discharged to the ground. The core harvesting machine has a rotating brush core capturing system that collects green aeration cores directly from an aeration machine to which the core destroying machine is attached. The collected green cores are discharged from the brush collector system and received by a core destroying apparatus including three rotary paddle assemblies co-operating with corresponding arcuate screens to separate the earthen material from the root thatch before discharging the thatch into a collector vessel. The core harvesting machine includes paddle members having overlapping arcs of rotation that have a relatively flat side and an opposing bent side to enhance the operation of the machine is either mode of operation. The overlapping paddles eliminate dead spots on the machine, including sweeping the adjacent paddles during rotation, to prevent any major build-ups of dirt and debris.

43 Claims, 10 Drawing Sheets

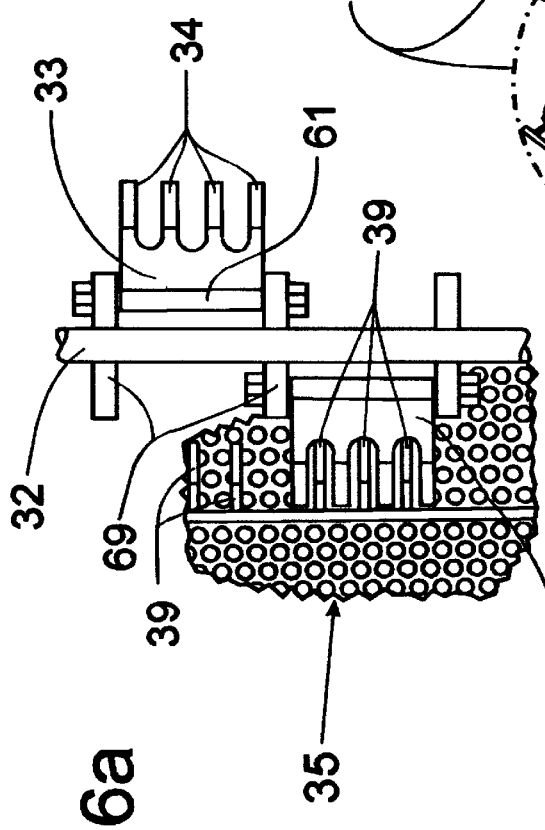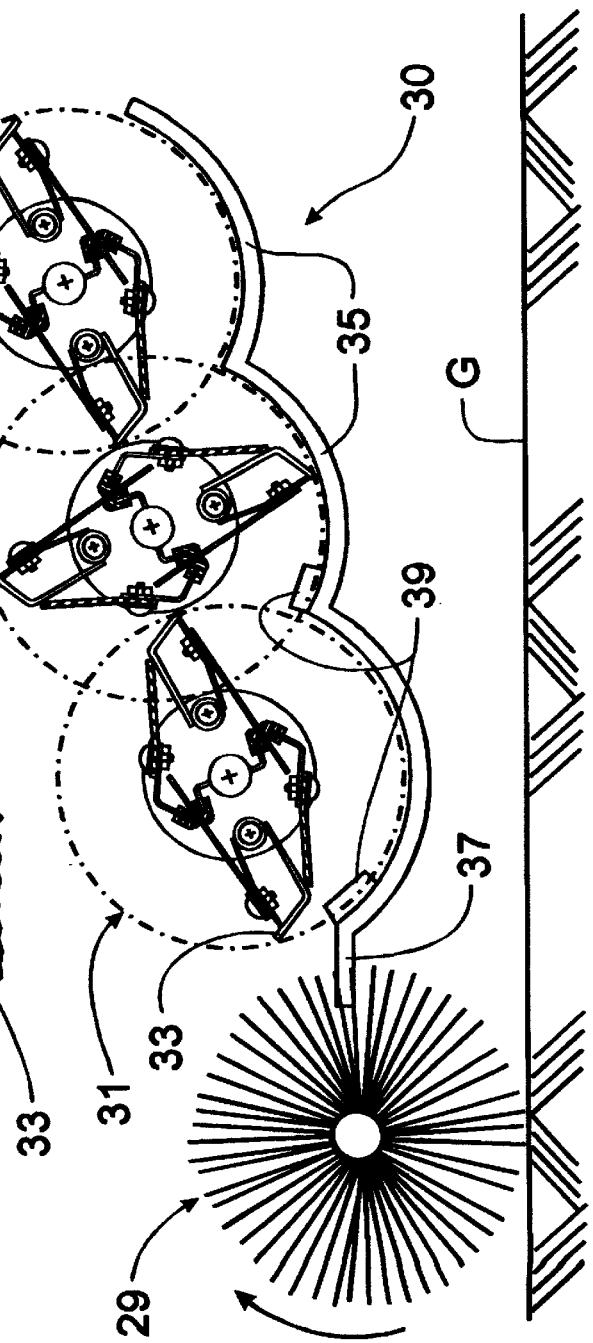

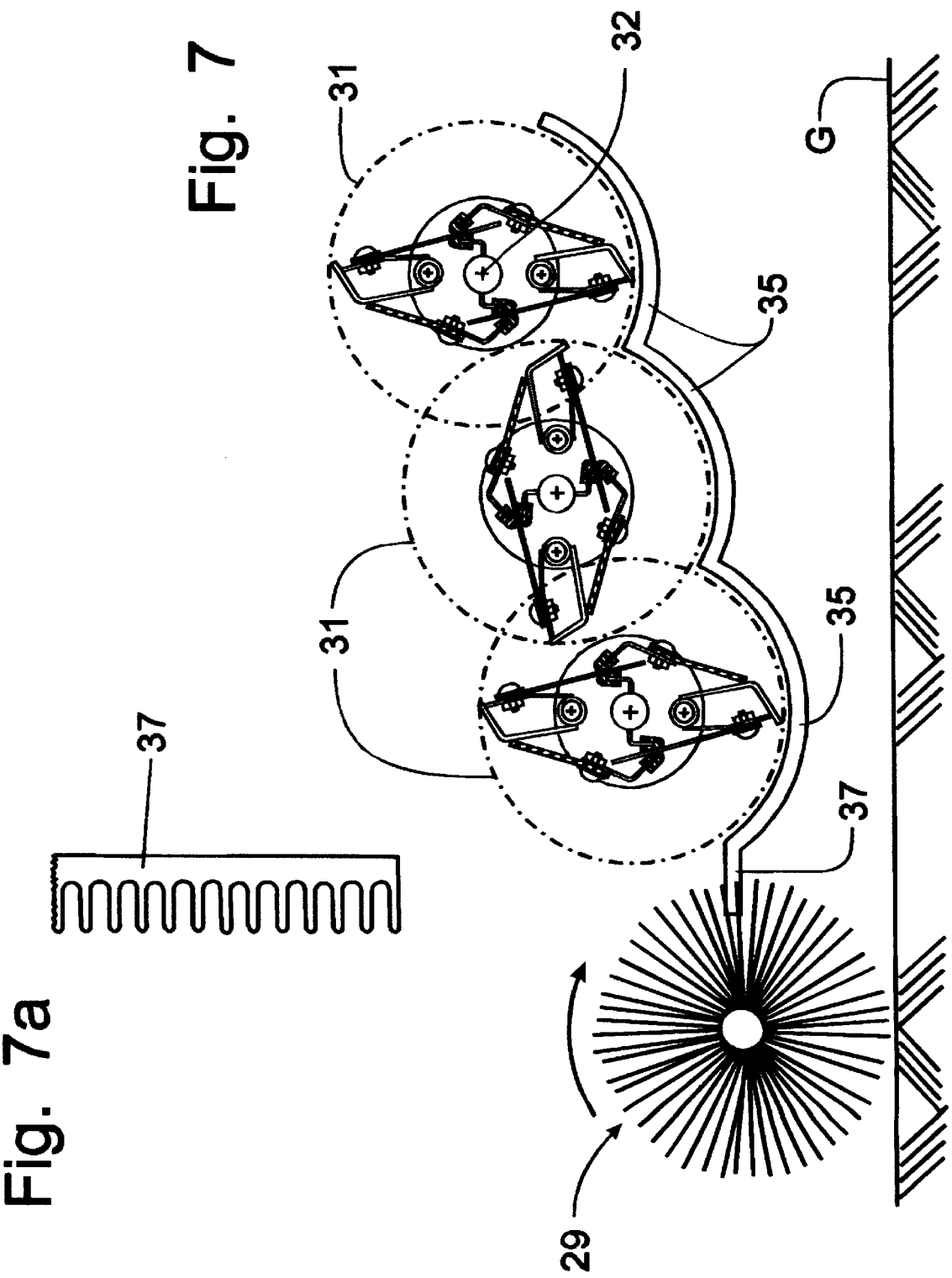

APPARATUS FOR COLLECTING/DESTROYING AERATION CORES

This Application claims benefit of Prov. No. 60/113,213 filed Dec. 22, 1998.

BACKGROUND OF THE INVENTION

This invention relates generally to a machine for receiving green or dry cores from a turf aeration machine that removes plugs or cores of earth from the ground, such as is done on golf courses to enhance the growth of the grasses, and removing the earth from the vegetation thatch. This invention relates more specifically to an apparatus that utilizes a rotating scrubbing action to reduce the cores to the vegetation thatch and return the earth to the ground, while collecting the remaining vegetation thatch.

Aeration machines are well known in the art. These machine drive a hollow tine into the ground to create a plug of earth that is lifted above the surface of the ground and deposited on the surface. Generally, green cores, i.e. cores of earth freshly elevated from the moist ground, have to be dried for 2 to 4 hours, depending on the weather conditions, before the earthen portion can be removed from the vegetation thatch on top of the plug and the associated root system. It is preferable to return the earthen portion of the cores to the ground; however, the organic matter needs to be removed from the aerated site. Alternatively, the cores can be removed from the aerated site and taken to a remote location for subsequent handling.

While the task of aerating is a highly labor intensive job, the cost of clean-up after aeration is as great as aeration itself. Known core harvesting machines, such as found in U.S. Pat. No. 1,368,113 and in U.S. Pat. No. 3,410,350, suffer from a substantial problem of plugging, particularly if the cores are not adequately dried before collecting and harvesting. If the cores are not dried adequately, the moist earthen portion from the cores plug the core harvesting machines. Under some conditions, the cores can be dried too much and the earth cannot be broken-up properly for satisfactory disposal thereof.

Using golf courses as an exemplary environment typically utilizing aeration to improve the quality of the turf on which the players play, it is undesirable to hinder play for the aeration process. Golf courses and their members do not want their pastime interrupted by maintenance crews and, as a result, the aeration is intentionally done in as short a time as possible. The cores can be picked-up and removed from the ground and taken to a remote location, but this process is very labor intensive and requires the transportation of the green cores from the course. Even cores temporarily left on the ground immediately following the aeration process can be run over by the aeration machine on its next pass, creating problems with a clean pick-up of the cores. Preferably, the cores are not left on the ground for an indeterminate period, even in areas not highly frequented, as mowing becomes complicated due to the cores plugging the mowers and prematurely dulling mower blades.

Current core destroying technology involves the utilization of a machine commonly referred to as a "verti-cutter". This machine is provided with a series of vertically oriented blades that are passed over the surface of the ground to slice cores into finer particles. If the cores are still wet, also know as being "green", the verti-cutter can become plugged or wrapped with the vegetation thatch, associated root system and moist earth that is separated from the rest of the core and carried around the vertical blades.

Other known core destroying machines use a cylindrical rotating screen to separate the earth from the organic matter. Such machines require extensive screening area and become quite cumbersome in both handling and operation. Furthermore, the longitudinally extending rotary screen requires a consolidation of the swath of cores into a transversely smaller area, resulting in a dense collection of cores to be destroyed and a concentrated distribution of earth discharged back to the ground. Also, machines using a rotary screen are difficult to couple to an aeration machine so as to receive green cores directly therefrom.

Accordingly, it would be desirable to provide a wet/dry core harvesting machine that can be operated immediately following an aerator, or even receiving the green cores directly from the aerator, to reduce the wet cores and return the moist earth directly to the ground, while collecting the remaining vegetation thatch. It would be further desirable if such a wet core harvesting machine could be operated at night when golf courses are not being utilized to completely eliminate the interruption of play on golf courses due to the aeration process. It would also be desirable that the core harvesting machine be equally operable on wet or dry cores.

It would be particularly desirable to provide a core harvesting machine that could be coupled with an aeration machine to receive aeration cores directly therefrom to permit the combination aerator/core destroyer in one pass across the ground to aerate the ground, to eject the cores into a core destroying component, to destroy the green cores to return the earth to the ground in the form of a top dressing, and to collect the organic matter. Since the green cores never need to be deposited on the ground and dried for any predetermined period of time, such an operation would not be sensitive to the time of day during which the aeration is being accomplished. As a result, aeration could be accomplished by such a machine at night without interruption of operation of a golf course or other appropriate facility.

One such core destroyer machine can be found in U.S. Pat. No. 5,816,336, issuing on Oct. 6, 1998, to Kenneth R. Underhill. This machine generally solves the problems identified above with a machine that utilizes a reciprocating scrubbing mechanism co-operable with a stepped screen member to remove the earthen portion of green aeration cores from the root thatch, returning the earth to the surface of the ground and collecting the thatch. While this machine successfully solved the problem of destroying green aeration cores, it is desirable to simplify the operation and the structure of the machine and to permit the machine to be coupled with any aeration machine irrespective of the manufacturer.

SUMMARY OF THE INVENTION

It is an object of this invention to provide a core destroying machine operable to disintegrate wet or dry aeration cores and allow the earthen portion to be returned to the ground as a top dressing, while collecting the organic thatch portion thereof.

It is another object of this invention to provide a core destroying machine that utilizes a rotary action to effect destruction of green aeration cores.

It is an advantage of this invention that the organic thatch material of the aeration cores is swept rearwardly by the scrubbing mechanism until discharged into a collection vessel.

It is still another object of this invention to provide a core destroying machine that is operable in conjunction with an aeration machine to receive green cores directly therefrom to disintegrate the green cores without the cores contacting the ground.

It is a feature of this invention that the core destroying mechanism can be adapted directly to a aeration machine to receive the moist aeration cores directly therefrom.

It is another advantage of this invention that the green cores discharged from the aeration machine never contact the surface of the ground.

It is another feature of this invention to provide a series of rotary beaters co-operable with corresponding arcuate screens to destroy aeration cores received by a core destroying machine.

It is still another advantage of this invention that the core destroying machine can be utilized selectively in different configurations to collect aeration cores or to destroy them.

It is yet another object of this invention to provide a core destroying machine that is operable to destroy green aeration cores while utilizing a simple rotary motion in the operation of the machine.

It is a further object of this invention to provide a core destroying machine that is mountable with aeration machines of substantially any manufacturer.

It is yet another object of this invention to provide an apparatus that is operable with substantially any aeration machine to capture the aeration cores therefrom before being discharged to the ground.

It is still another feature of this invention that the core capturing system incorporates a brush mechanism co-operable with a flexible core guide to capture the aeration cores being ejected by the aeration tine.

It is yet a further object of this invention to provide a mechanism connected to the aeration machine to effect a de-clutching of the powered operation of the core destroying machine upon the raising of the aeration machine into an inoperative position.

It is yet another advantage of this invention that the operation of the core destroying machine when coupled to an aeration machine is rendered inoperable automatically with the raising of the aeration machine into an inoperative position.

It is a further feature of this invention that the rotary members are configured in an overlapping manner to eliminate any dead spots between rotary members that can build up with debris and reducing the operating efficiency of the core destroying machine.

It is still a further feature of this invention that each of the rotary members are formed as a paddle mechanism having pivotable paddle members.

It is a further advantage of this invention that the paddle members are mounted to deflect in opposing directions to enhance the operation of the machine in both a core collecting mode and a core destroying mode.

It is still a further advantage of this invention that the paddle members are configured to have a relatively flat side that engages cores in the core collecting mode of operation to simply convey cores rearwardly, and a bent shape on the opposing side that engages cores in the core destroying mode to enhance the disintegration of the aeration cores.

It is a further feature of this invention that the paddles are arranged so that the adjacent paddles sweep against each other during rotation to clear dirt and debris from the central part of the paddle member.

It is yet a further feature of this invention that the overlapping configuration of the paddle members eliminate substantially all dead areas on the machine to prevent any major build-ups of dirt and debris.

It is a further advantage of this invention that the operation of the core destroying machine is simple and efficient to enhance the effectiveness of the core destroying machine.

It is still a further feature of this machine that a comb stripper is provide in conjunction with the brush capturing system to prevent the cores from being re-circulated with the brush mechanism and, possibly discharged to the ground.

It is still another feature of this invention that the core destroying machine reduces labor, minimizes compaction on the ground, enhances thatch decomposition, destroys both wet or dry cores, and provides flexibility for use at night as well as during the daylight hours.

It is still a further advantage of this invention that labor costs are reduced because of the reduced need for handling the wet aeration cores discharged from the aerator and because the aeration cores are handled faster.

It is yet a further advantage of this invention that the combined operation of an aerator and an attached core destroyer results in less traffic over the ground and, therefore, less compaction of the aerated ground surface.

It is still another object of this invention to provide a drive mechanism for a core destroying machine that is operable to convert the machine into a core collecting machine that merely collects the cores in a receptacle instead of destroying them.

It is yet a further feature of this invention that the single core destroying machine can be used selectively as a core destroying and a core collecting machine.

It is yet a further advantage of this machine that the drive mechanism can be changed to convert the machine between core destroying and core collecting modes by simply re-orienting a drive belt entrained around drive members for the rotary beaters.

It is yet another object of this invention to provide a core destroying machine that is operable to disintegrate wet or dry aeration cores and which is durable in construction, inexpensive of manufacture, carefree of maintenance, facile in assemblage, and simple and effective in use.

These and other objects, features and advantages are accomplished according to the instant invention by providing a core destroying machine that can be mounted to the rear of substantially all manufacturer's aeration machines to receive green cores directly from the aeration machine without having the cores discharged to the ground. The core destroying machine has a rotating brush core capturing system that collects green aeration cores directly from an aeration machine to which the core destroying machine is attached. The collected green cores are discharged from the brush collector system and received by a core destroying apparatus including three rotary beaters co-operating with corresponding arcuate screens to separate the earthen material from the root thatch before discharging the thatch into a collector vessel. The drive mechanism can be easily changed to convert the core destroying machine into a core collecting machine via a simple re-orientation of a drive belt. The core destroying/collecting machine is provided with a power source that can be coupled with the aeration machine in a manner to de-clutch the operation of the core destroying/ collecting machine with the raising of the aeration machine into a raised inoperative position. The thatch collecting receptacle is pivotally supported on the core destroying machine frame to permit easy dumping of the load of aeration cores and/or root thatch at a selected location. The core destroying/collecting machine includes overlapping paddle members that have a relatively flat side and an opposing bent side to enhance the operation of the machine is either mode of operation. The overlapping paddles eliminate dead spots on the machine, including sweeping the adjacent paddles during rotation, to prevent any major build-ups of dirt and debris.

BRIEF DESCRIPTION OF THE DRAWINGS

The inventions disclosed herein will be best understood with reference to the attached drawings, including:

FIG. 6 is a schematic partial elevational view of the core destroying mechanism;

FIG. 6a is an enlarged partial top view of the paddle assembly depicted as an orthogonal projection from FIG. 6;

FIG. 7 is a schematic partial elevational view of the core destroying mechanism similar to that of FIG. 6;

FIG. 7a is an enlarged partial top view of the stripper comb positioned at the front of the arcuate screen member to remove cores from the collection brush, depicted as an orthogonal projection from FIG. 7;

DESCRIPTION OF THE PREFERRED EMBODIMENT

Figure 1:
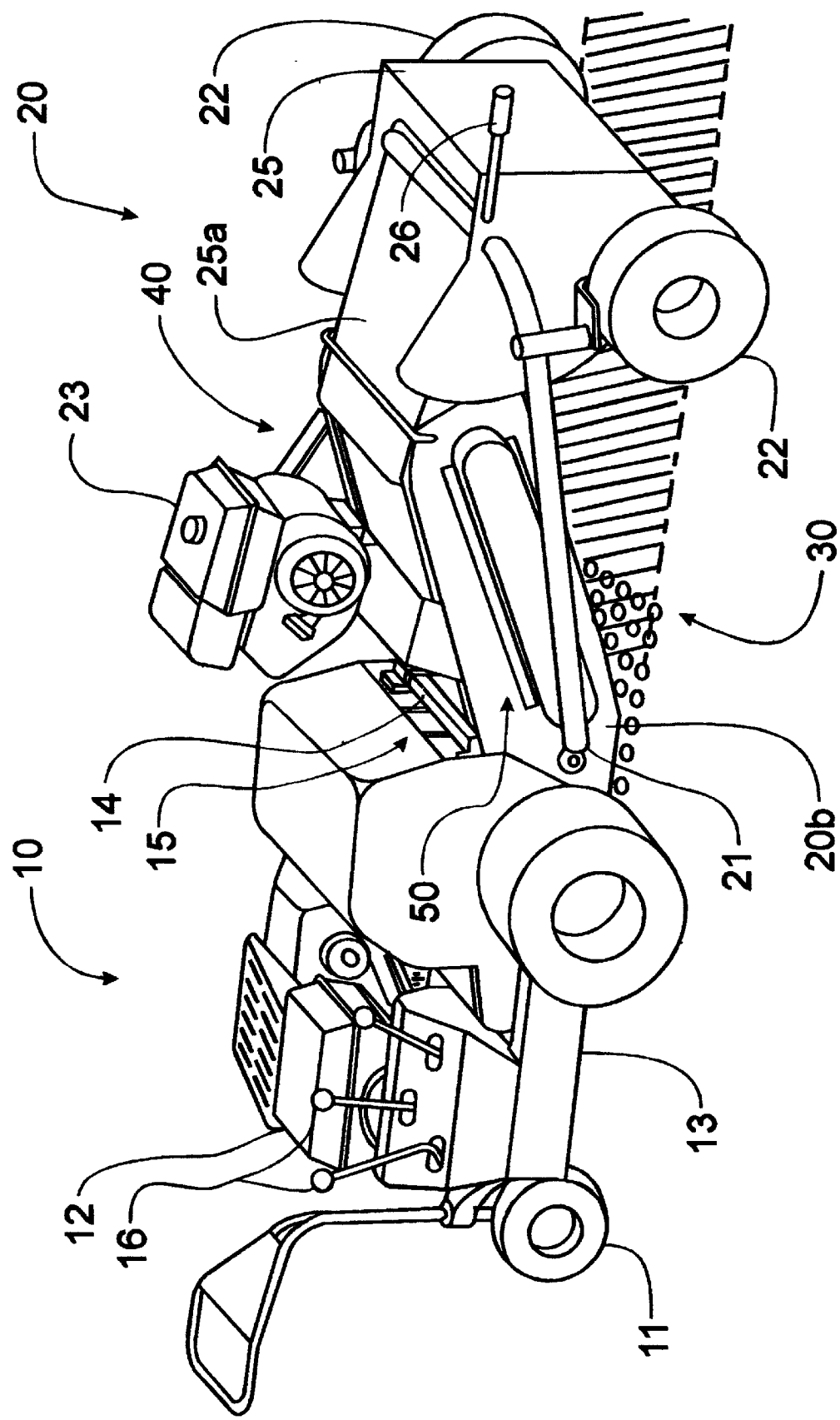
FIG. 1 is a perspective view of a core harvesting machine incorporating the principles of the instant invention shown attached to a conventional aeration machine, the core harvesting machine being in a core destroying mode of operation.
Figure 2:
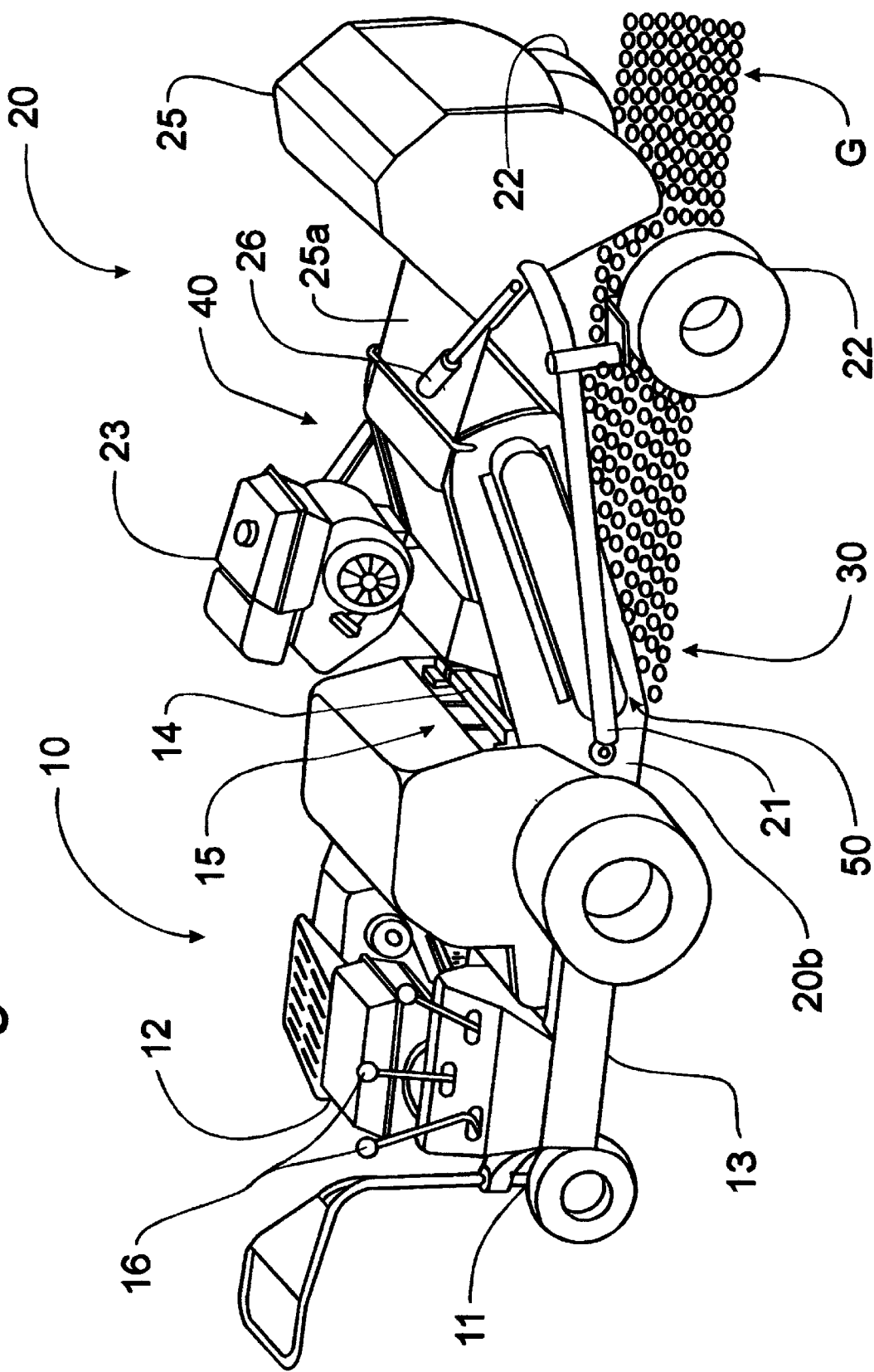
FIG. 2 is a perspective view of the core harvesting machine of FIG. 1 shown attached to a conventional aeration machine with the core harvesting machine being in a core collecting mode of operation, the thatch receptacle being depicted in a pivoted dump position.
Figure 3:
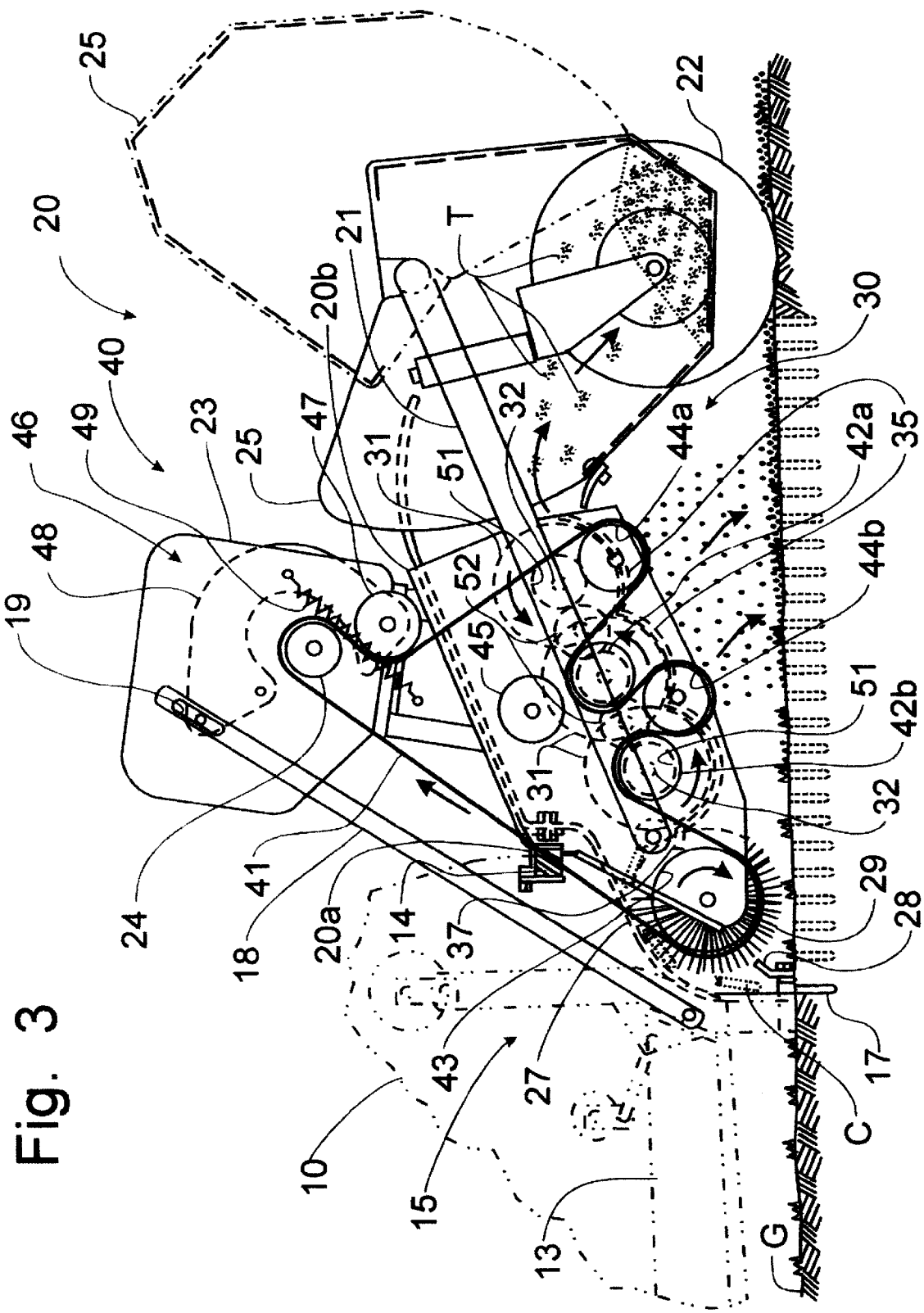
FIG. 3 is a schematic cross-sectional representation of the core harvesting machine operating in the core destroying mode, the thatch receptacle being depicted in a dump position in phantom lines, the representative aeration machine to which the core harvesting machine is attached also being shown in phantom.

Referring first to FIGS. 1–3, an overall perspective view of the core harvesting machine incorporating the principles of the instant invention can best be seen. The core harvesting machine 20 is shown attached to a conventional, representative aeration machine 10, shown as a walk-along model having a steerable front wheel 11 and an engine 12 providing a source of operative power for the operation of the aeration machine 10. The aeration machine 10 is also provided with a self contained hydraulic system having controls 16 that are operable, among other things, to raise the aeration mechanism 15 into an inoperative position via a pivotal movement of the aeration mechanism 15 relative to the base frame 13 of the aeration machine 10. One skilled in the art will recognize that the aeration machine 10 can be manufactured in a number of different configurations; however, all such known configurations involve the operation of an aeration mechanism that removes aeration cores from the ground and discharges the cores rearwardly from the machine 10. Any left and right references are used as a matter of convenience and are determined by standing at the rear of the core harvesting machine adjacent the thatch receptacle and facing the forward end, the direction of travel.

The core harvesting machine 20 is designed to mount directly to the rear portion of the aeration machine 10 to receive the aeration cores straight from the aeration mechanism 15. The core harvesting machine 20 has a pair of laterally spaced pivot arms 21 upon which are mounted ground engaging wheels 22 supporting a thatch receptacle 25 above the surface of the ground G. The core harvesting machine 20 is supported solely from the mounting of the machine 20 to the rear of the aeration machine 10. The core harvesting machine 20 is also provided with its own engine 23 to provide a source of operative power for the operation of the core harvesting machine 20 independently of the aeration machine 10. The core harvesting machine 20 is equipped with its own power source because of the variety of manufacturers of aeration machines 10 and the resultant different drive configurations for the aeration machines 10. The instant invention is intended to be operable with all aeration machines 10 irrespective of the manufacturer.

Figure 4:
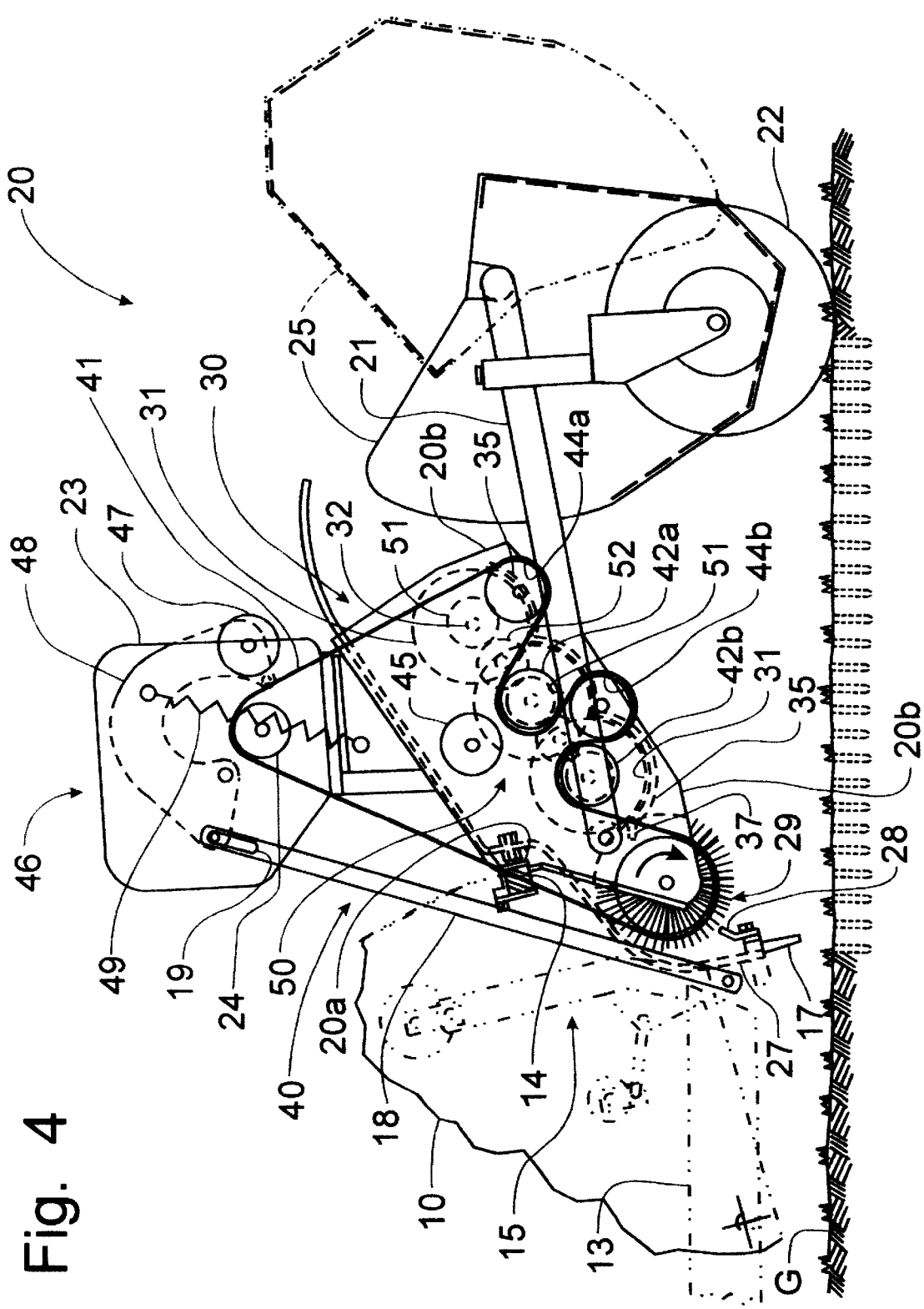
FIG. 4 is a schematic cross-sectional representation of the core harvesting machine operating in the core destroying mode, but raised into an inoperative position by the corresponding raising of the aeration machine into an inoperative position, the thatch receptacle being depicted in a dump position in phantom lines, the representative aeration machine to which the core harvesting machine is attached also being shown in phantom.
Figure 5:
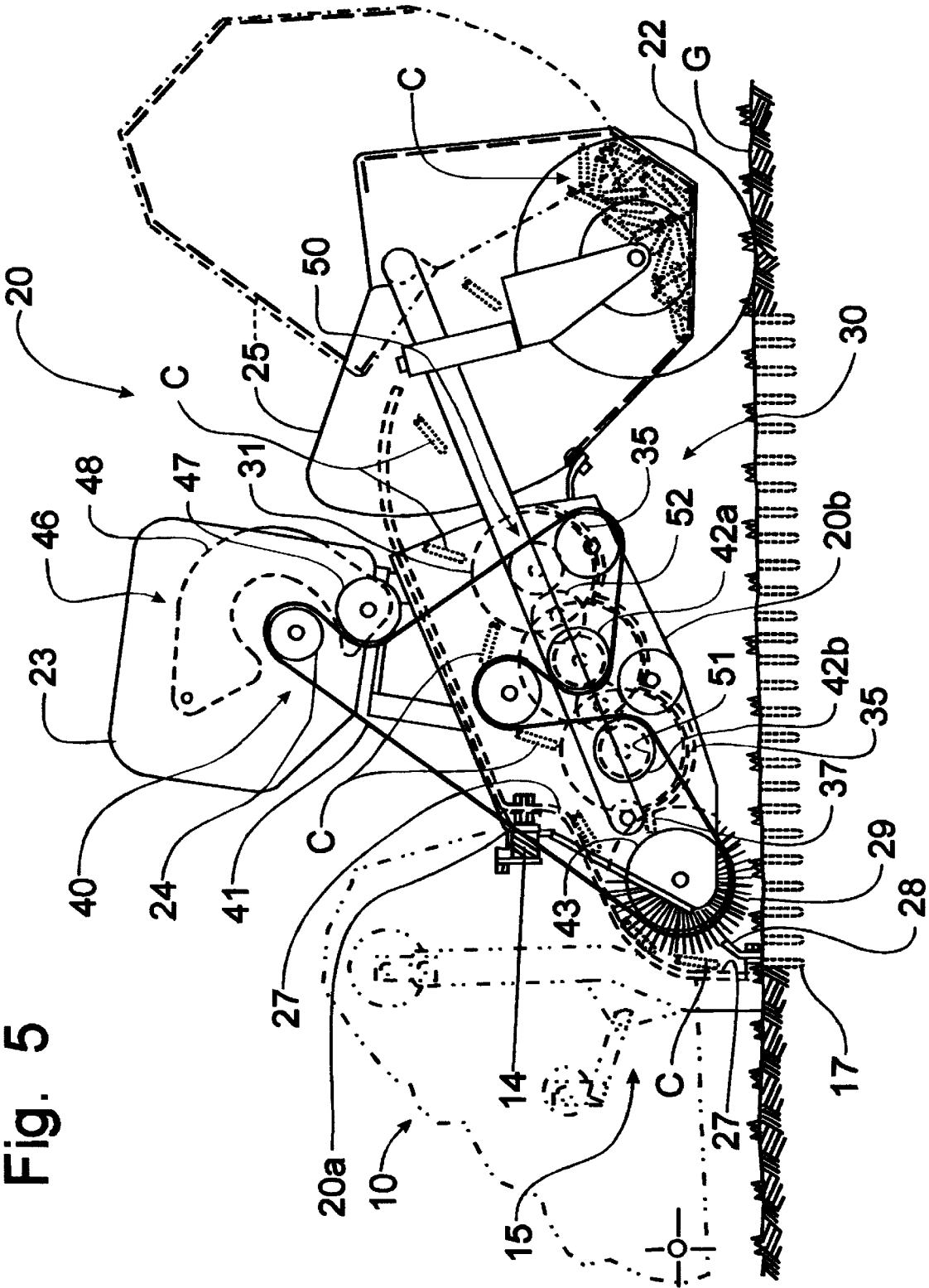
FIG. 5 is a schematic cross-sectional representation of the core harvesting machine operating in the core collecting mode, the thatch receptacle being depicted in a dump position in phantom lines, the representative aeration machine to which the core harvesting machine is attached also being shown in phantom.

The core harvesting machine 20 is operable in two different modes of operation: the core destroying mode shown in FIGS. 1, 3 and 4 and the core collecting mode shown in FIGS. 2 and 5. In the core destroying mode, the core harvesting machine 20 is operable to remove the earthen portion of the aeration cores C from the root thatch portion T, returning the earthen portion to the ground G and typically collecting the thatch portion T in the optional thatch receptacle 25, although in some instances the thatch portion could be simply discharged to the ground. The earthen portion of the aeration cores is returned to the ground in a finely scattered layer which can be swept into the aeration holes remaining in the ground G by a separate sweeping mechanism (not shown). The thatch portions T can be dumped at a remote location, as depicted in FIG. 2, without returning them to the ground where the aeration is being undertaken. The thatch receptacle 25 is pivotally supported on the pivot arms 21 for movement between a collecting position shown in FIG. 1 and a dumping position depicted in FIG. 2. The thatch receptacle 25 is provided with a handle 26 to permit the operator to pivotally move the receptacle 25 between the two positions as desired. Optional powered pivoting mechanisms, such as a hydraulic cylinder or electric actuator (not shown), could also be provided to facilitate the selective discharge of the collected thatch portions.

The operative details of the core harvesting machine 20 are best seen in FIGS. 3–6. The core harvesting machine 20 is coupled to the aeration machine 10, for example, by fastening the cross frame member 20a of the core harvesting machine 20 to a corresponding cross frame member 14 of the aeration machine 10, such as by bolting or clamping the two members 14, 20a together. A flexible core guide 27, preferably constructed from a tough yet generally flexible material such as tire carcass, is bolted to the harvester cross frame member 20a and also to the forward portion of the tines 17. Since the tines 17 move in a generally elliptical path during operation of the aeration machine 10, the connection of the flexible core guide 27 to the forward portion of the tines 17 allows the core guide 27 to follow the tines 17 throughout the path of movement and contain the aeration cores C being ejected from the tines 17. The flexible core guide 27 is bent into a generally "S-shaped" configuration to cooperate with the collection brush 29 while limiting the path of movement of the ejected aeration cores C.

As is depicted in FIGS. 3–5, 10 and 11, the coring apparatus 71 including the tines 17, moves through an elliptical path of movement, represented by the elliptical arc 72, that projects upwardly into the collection brush 29 so that the ejected earthen cores have no where to go except upwardly and rearwardly with the rotating collection brush 29. A comb 28 helps to close the gap between the collection brush 29 and the flexible core guide 27 in the forward part of the stroke of the coring apparatus 71 when the tines 17 move forwardly away from the collection brush 29. The flexible core guide 27 varies the gap between the guide 27 and the collection brush 29 as the coring apparatus 71 moves through its stroke because the flexible core guide 27 is physically connected to the cross frame member 20a of the core harvesting machine and the cross frame member 14 of the aeration machine 10 so that the rearward portion is generally fixed relative to the aeration machine 10, while the forward portion of the flexible core guide 27 is fastened to the coring apparatus 71 to be movable therewith.

The laterally spaced side sheets 20b of the core harvesting machine 20 rotatably support a transversely oriented collection brush 29 positioned at the forward end of the core harvesting machine 20. The collection brush cooperates with the flexible core guide 27 to transport the ejected aeration cores C from the tines 17 to the core destroying mechanism 30 positioned immediately rearwardly of the collection brush 29. Preferably, the collection brush 29 can be constructed from steel or plastic wires that sweep through a core retention comb 28 fastened to the rear portion of the tines 17 to prevent the ejected cores C from falling to the ground G. Other configurations of the brush 29 would include rubber tines and/or paddles, along with other suitable materials. The rotating collection brush 29 pulls the ejected aeration cores C from the aeration machine 10, trapping the cores C between the brush 29 and the flexible core guide 27 until discharging them into the core destroying mechanism 30. The core retention comb 28 positively engages the back side of the collection brush 29 to transfer the collected cores from the brush 29 rearwardly into the paddle assemblies 60.

The core destroying mechanism 30 preferably includes a series of beater assemblies 31, preferably three beater assemblies 31, extending transversely to the direction of travel and spaced longitudinally of each other rearwardly of the brush 29. One skilled in the art, however, will recognize that a single beater or paddle assembly 31 can be operable to effect a disintegration of the aeration cores. Each beater assembly 31 is rotatable about an axis of rotation 32 with each respective axis of rotation 32 being spaced longitudinally of the corresponding axes of rotation 32. Each beater assembly 31 is supported between the side sheets 20b and is formed from a plurality of offset pairs of paddles 33 mounted to a central shaft forming the axis of rotation 32, as shown representatively in FIG. 6, though one skilled in the art will recognize that FIG. 6 only depicts one of each pair of opposing paddles in the orthogonal projection. Transversely along the length of the beater assembly 31, each pair of paddles 33 is opposingly oriented with respect to the corresponding axis of rotation 32, but each transversely succeeding pair of opposing paddles 33 are offset radially about the corresponding axis of rotation 32 so that all paddles 33 on each beater assembly 31 do not engage ejected cores simultaneously. As is best seen in FIGS. 3–5, each corresponding pairs of paddles 33 on longitudinally spaced beater assemblies 31 are also offset with respect to one another due to the overlap in travel paths, as will be explained in greater detail below.

In the core destroying mode of operation, each beater assembly 31 is cooperable with an arcuate concave screen member 35 positioned below the corresponding beater assembly 31. The paddles 33 are oriented to sweep against the concave screen members 35 to rub the ejected green cores against the screen and force the separation of the earthen material from the thatch portion T. The separated earthen material is forced through the holes in the screen member 35 and discharged therethrough to the surface of the ground G. The beater assemblies 31 are arranged in a upwardly extending, longitudinally spaced manner to disintegrated core pieces from one beater assembly 31 rearwardly to the next succeeding beater assembly 31 until the final beater assembly 31 has separated the final remnants of the earthen material from the thatch portion and discharged the thatch portion into the rearwardly positioned thatch receptacle 25. The paths of rotation of the paddles 33 overlap in an overlap zone between the adjacent beater assemblies 31. The provision of the overlap zones eliminates any dead areas in the core destroying mechanism 30. The discharge of core pieces from one beater assembly 31 is directly into the rotational path of the paddles 33 of the beater assembly 31 immediately adjacent thereto. Each screen member 35 preferably terminates immediately below the point of intersection of the paths of rotation of the adjacent beater assemblies 31, i.e. immediately below the overlap zone, before becoming the next screen member 35.

As best seen in FIG. 3, the direction of rotation of the beater assemblies 31 is counterclockwise, when viewed from the left side, which operates to drive the ejected cores received from the collection brush 29 downwardly into the screen member 35 corresponding to each said beater assembly 31 as the ejected core pieces are discharged from the collection brush 29 and the successive beater assemblies 31. In the core collection mode, best seen in FIG. 5, the beater assemblies 31 are rotated in the clockwise direction as viewed from the left side of the machine 20 to direct the ejected cores received from the collection brush 29 upwardly to be discharged from one beater assembly 31 to another above the screen members 35 until discharged by the last beater assembly 31 into the thatch receptacle 25 as partially intact aeration cores C. While the cores C will typically be somewhat chewed up by the action of the beater assemblies 31, depending on the soil type of the earthen material and the depth of the root zone of the thatch portion, the transportation of the cores C rearwardly over top of the beater assemblies 31 preferably effects a transportation of both the separated dirt and the thatch portion T into the thatch receptacle 25 for subsequent disposition.

A drive mechanism 40 is provided to operably power the rotation of the beater assemblies 31 and the collection brush 29. The drive mechanism 40 includes the engine 23 which has an output drive pulley 24. An endless drive belt 41 is entrained around the output drive pulley 24 and a first driven pulley 42a, 42b corresponding to each beater assembly 31 and a second driven pulley 43 corresponding to the collection brush 29. Idler pulleys 44 and 45 are utilized during the different modes of operation of the core harvesting machine 20 to effect proper rotation of the beater assemblies 31 as will be described in greater detail below. A tensioning mechanism 46 is operatively associated with the drive mechanism 40 to maintain tension in the drive belt 41 during driving operation of the machine 20. The tensioning mechanism 46 includes a tensioning idler 47 mounted on an arcuate pivot member 48, shaped to extend around the output drive pulley 24. A spring 49 interconnecting the pivot member 48 and a side sheet 20b biases the pivot member 48 such that the tensioning idler 47 is engaged with the drive belt 41 to place tension in the drive belt 41 and allow the transmission of rotational power to the driven pulleys 42, 43.

As best seen in FIG. 4, the pivot member 48 is connected to a de-clutching link 18 which in turn is pinned to the base frame 13 of the aeration machine 10. The de-clutching link 18 is formed with an enclosed slot 19 at the end of the link 18 to provide a minimal amount of lost motion movement of the de-clutching link 18 relative to the core harvesting machine 20, so as to allow the tensioning mechanism 46 to seek proper equilibrium without being restricted by the de-clutching link 18. When the aeration mechanism 15 is pivotally raised, as demonstrated in FIG. 4, the core harvesting machine 20 is raised in response thereto because of the mounting of the core harvesting machine 20 to the cross frame member 14. When the core harvesting machine 20 raises, the engine 23 also raises; however, the de-clutching link 18 does not raise due to the connection thereof with the base frame 13 of the aeration machine 10.

The initial raising movement of the core harvesting machine 20 and the engine 23 is taken up in any remaining portion of the slotted opening 19; however, when the length of the slot 19 has been used up, the de-clutching link 18 pulls on the pivot member 48 and effects a movement of the tensioning idler 47 away from the drive belt 41, thereby reducing the tension in the drive belt 41. Without proper tension in the drive belt 41, the drive mechanism 40 is incapable of transmitting rotational power to the driven pulleys 42a, 42b and 43. As a result, the driving operation of the core harvesting machine 20 is terminated upon the raising of the aeration mechanism 15 into a non-operative position. One skilled in the art will recognize that the engine 23 still rotates the output drive pulley 24; however, no rotational power can be transmitted through the drive belt 41 unless proper tension is applied to the belt 41.

The drive mechanism 40 can be converted between the core destroying mode and the core collection mode of operation simply by re-orienting the drive belt 41 to effect proper rotation of the beater assemblies 31. Referring first to the core destroying mode depicted in FIG. 3, the drive belt 41 passes around the first idler pulley 44a then extends around the top of the driven pulley 42a corresponding to the middle beater assembly 31 to effect rotation in the aforementioned counterclockwise direction, then around the second idler pulley 44b and again over the top of the driven pulley 42b for the front beater assembly 31. The drive belt 41 then passes beneath the drive pulley 43 for the collection brush 29 before returning to the drive output pulley 24 of the engine 23. Preferably, the drive belt 41, driven pulleys 42, 43 and idler pulleys 44, 45 are mounted on the right side of the core harvesting machine 20.

To maintain proper timing between the beater assemblies 31, each beater assembly 31 is interengaged with the other beater assemblies 31 by a drive timing mechanism 50, including a beater drive transfer gear 51 on the left end of each beater assembly 31 and an intermediate drive transfer gear 52 interposed between each of the beater drive transfer gears 51. The utilization of the drive transfer gears 51, 52 keeps the beater assemblies 31 in proper timing to prevent the paddles 33 on adjacent beater assemblies from impacting one another in the overlap zones. The drive mechanism 40 places direct driving power from the drive belt 41 to the front and middle beater assemblies 31 because of these beater assemblies have the greatest power requirements due to the greatest amount of core disintegration occurring in these two beater assemblies 31. The last beater assembly 31 is preferably rotatably driven only through the drive transfer gears 51, 52. The drive belt 41 will absorb any tolerance problems in the drive mechanism 40 by allowing a limited amount of slippage between the drive belt 41 and the drive pulleys 42. Another purpose in the wrapping of the drive belt 41 around both of the two front driven pulleys 42a, 42b is to provide adequate engagement between the drive belt 41 and the drive mechanism for the beater assemblies 31 to effect a power transfer therewith, particularly in view of the relative small size of the drive pulleys.

Conversion of the core harvesting machine 20 from the core destroying mode into the core collection mode of operation involves a re-configuration of the drive mechanism 40. By taking the tension off of the drive belt 41, the operator can re-configure the drive path as shown in FIG. 5, which corresponds to the core collection mode. The drive belt 41 again extends from the drive output pulley 24 around the first idler pulley 44a. Then the drive belt 41 engages the middle beater assembly driven pulley 42a along the forward side thereof to effect rotation of the driven pulley 42a in the clockwise direction when viewed from the left side. Passing the drive belt 41 around the upper idler pulley 45 enables the drive belt 41 to engage the rearward side of the front beater assembly driven pulley 42b to effect the aforementioned clockwise direction of rotation. Again the drive belt 41 extends around the driven pulley 43 for the collection brush 29 and returns to the output drive pulley 24. As noted above, the last, most rearward beater assembly 31 is driven through the operation of the drive transfer gears. In this mode of driving the beater assemblies 31, the cores are conveyed from beater assembly 31 to beater assembly 31 rearwardly until becoming discharged into the thatch receptacle as demonstrated in FIG. 5.

As depicted in FIG. 7a, the front screen member 35 is provided with a stripper comb 37 extending along the entire transverse length of the screen member 35 to engage the collection brush 29 and assure that all ejected cores are removed from the collection brush 29. Furthermore, as best seen in FIG. 6, the front screen member 35 is preferably provided with a plurality of transversely spaced core destroying fins 39 that are aligned with the gaps between the teeth 34 of the paddles 33. In the core destroying of operation, the paddles 33 drive the collected cores downwardly over the core destroying fins to effect an initial breakup of the green cores before being swept over the screen members 35. Each of the succeeding screen members 35 could also be provided with core destroying fins 39. Preferably, the core destroying fins 39 located at the juncture of the first and second screen members 35 are mounted in a manner to be engageable with both the paddles 33 of the first beater assembly 31 and the paddles 33 of the second beater assembly 31. Although the succeeding screen members could also be provided with fins 39, it has been found that effective destruction of the green cores can be obtained with the placement of the fins 39 only on the front and middle screen members 35.

Figure 8:
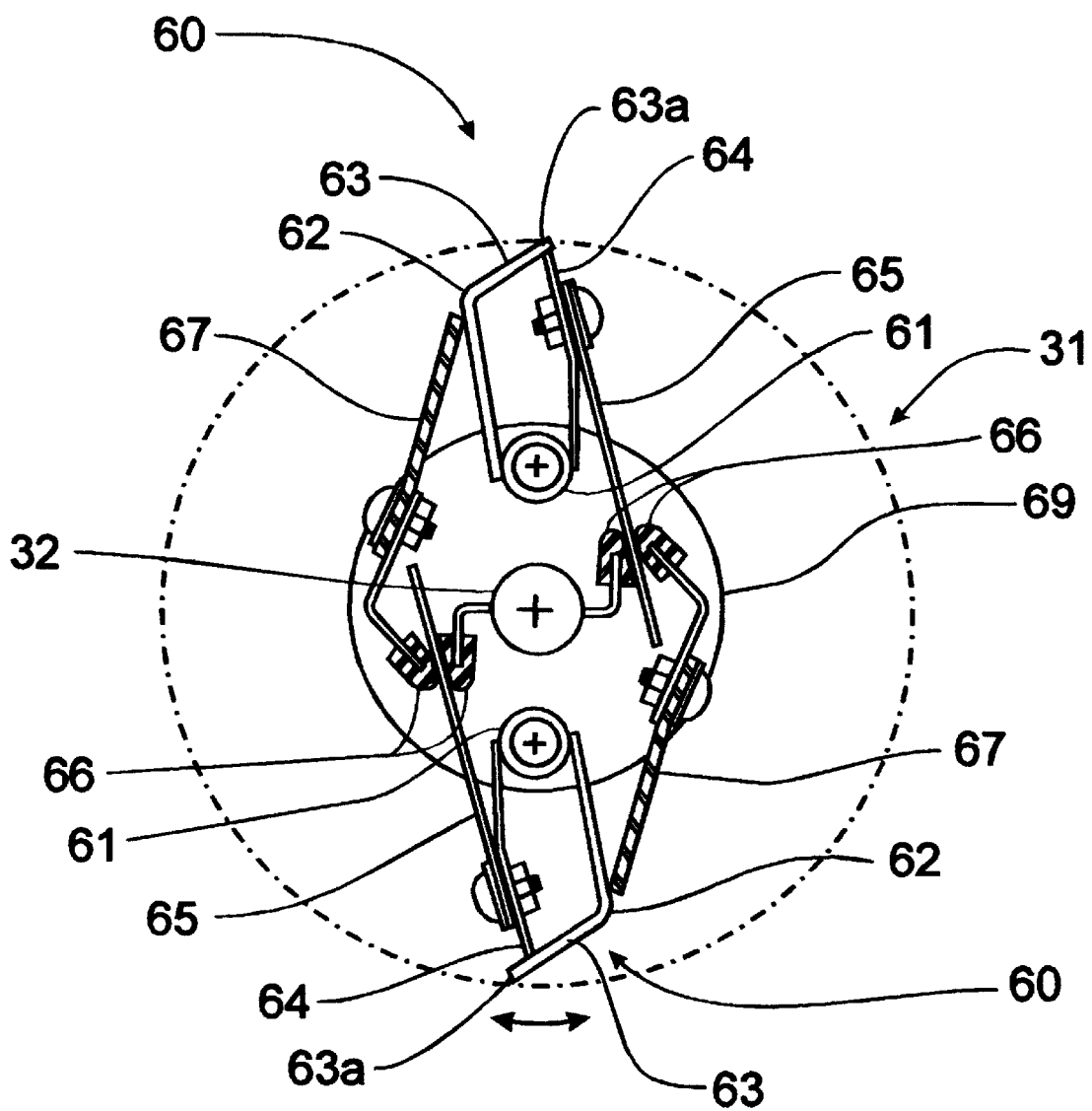
FIG. 8 is an end view of an alternative beater paddle configuration.
Figure 9A:
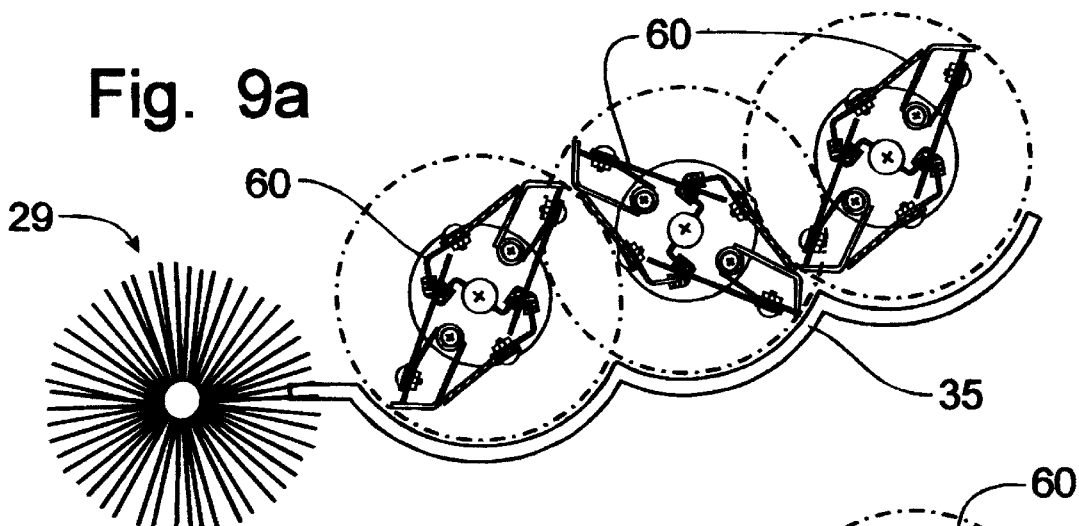
FIGS. 9a–9c are schematic partial elevational views of the core destroying mechanism with the beater paddles rotated through different positions to depict the close interaction between the adjacent beater paddle assemblies.
Figure 9B:
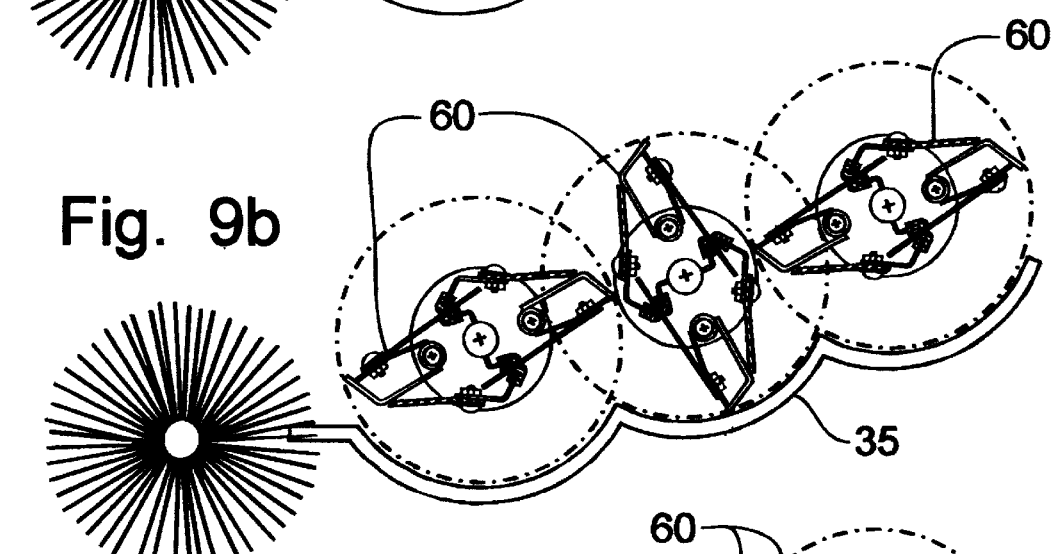
Figure 9C:
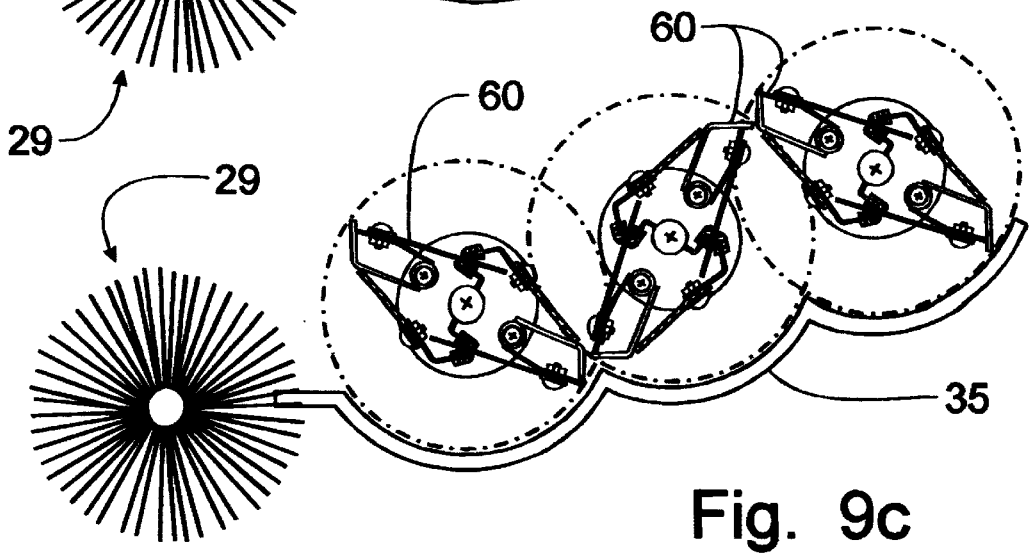
Figure 10:
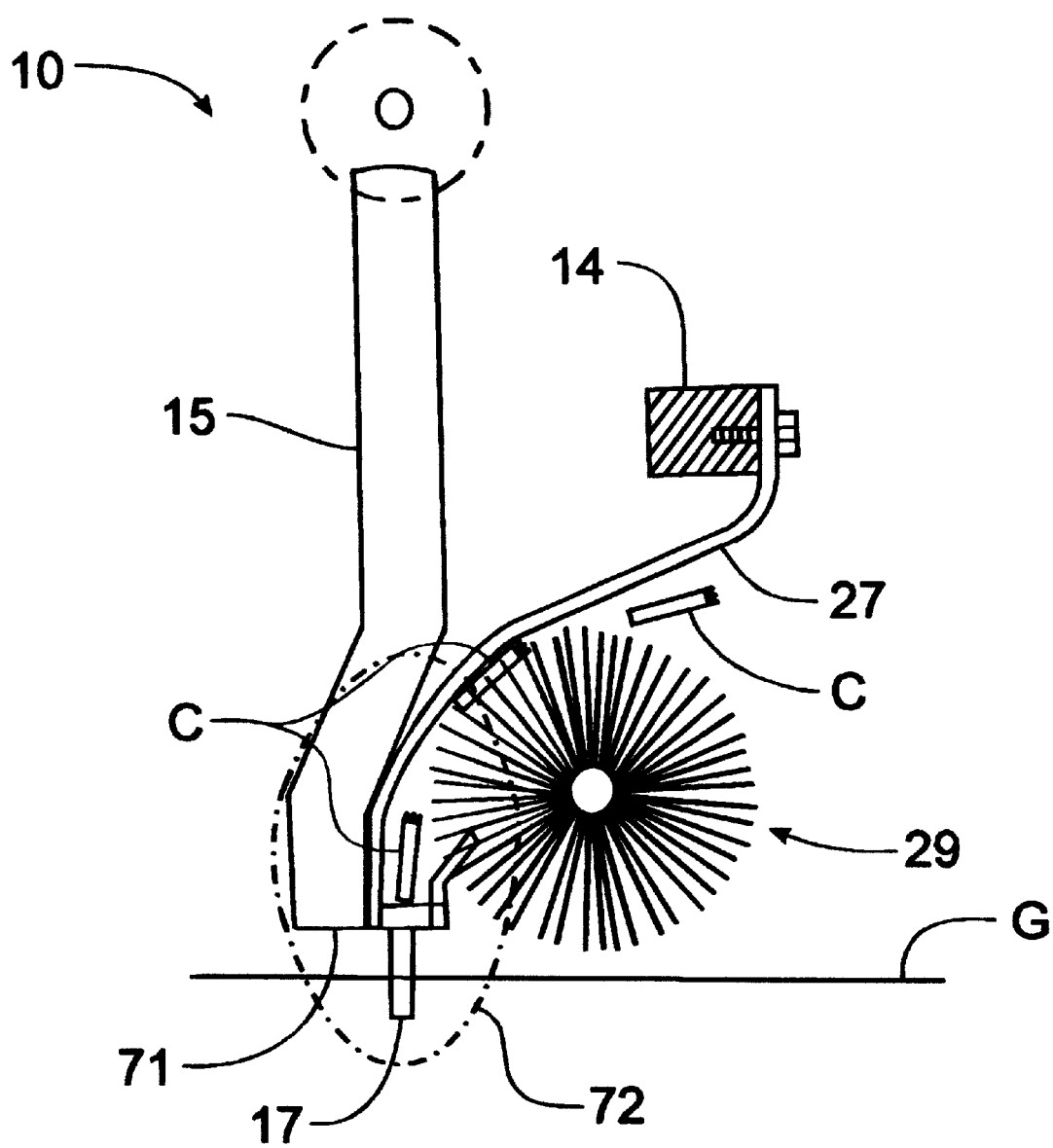
FIG. 10 is a schematic representation of the connection between the core destroying mechanism and a conventional aeration machine, the elliptical path of movement of the core mechanism moving into engagement with the collection brush being schematically depicted.

As best seen in FIGS. 6a and 8, a preferred configuration of the beater assembly 31 can be seen. The beater paddles 60, only one opposing pair being depicted in FIG. 8, are positioned on opposing sides of the shaft defining the axis of rotation 32. Each paddle 60 is mounted on a transverse pivot 61 carried by a generally circular disk 69 to permit limited movement in a fore-and-aft direction. The paddle 60 includes a leading (when in the core destroying mode of operation) dog-leg member 62 having an angled leg portion 63 terminating in a tip 63a adjacent the screen member 35. The angled leg portion 63 is oriented at an acute angle to the concave screen member 35 to form a triangular core destroying zone in which cores C are reduced or destroyed by separating the earthen portion from the thatch T, the shape of the angled leg portion 63 pushing the cores through the holes in the cooperating screens. The paddle 60 and the screen 35 must be manufactured rather precisely so that the paddle 60 lightly scrubs across the concave surface of the screen 35. The tip 63a of the paddle 60 must be oriented at the zenith of an arc centered at the pivot 61 of the paddle 60 so that the tip 63a will deflect away from the screen 35 in either direction relative to the path of rotation in the event a stone or other hard object lodges between the paddle 60 and the screen 35.

The paddle 60 also includes a slightly bent transport member 64 that serves as the leading portion of the paddle 60 when the core harvesting machine 20 is in a core collection mode of operation. The transport member 64 is configured with a slightly leading orientation to better effect the transportation of the collected cores over the top of the beater assemblies 31. The transport member 64 exerts no downward force on the cores being collected and transported so that the operation of the paddle 60 in the core collection mode throws the core rearwardly with preferably very little destruction, depending on the soil type of the earthen material and the size of the root zone for the thatch portion. Preferably, the entire core, including the broken portions, will be collected rearwardly with little passing through the screen to the surface of the ground.

The transport member 64 has a spring plate 65 affixed thereto to bias the paddle 60 into a nominal operating position, as depicted in FIG. 8. In the event a stone or other non-disintegrating body is picked up into beater assembly 31 and trapped in the aforementioned core destroying zone, the paddle 60 will deflect about its pivot axis 61 and deflect the spring plate 65, which will then return the paddle 60 to the nominal operating position after the non-disintegrating body is discharged from the beater assembly 31. The spring plate 65 is retained by a pair of rubber or plastic slides 66 to facilitate the deflection of the spring member 65. The spring member 65 is also operable to bias the paddle 60 into the nominal operating position when the core harvesting machine 20 is operating in the core collection mode. A flexible filler plate 67, preferably constructed from rubber or plastic, spans the gap between the slides 66 and the dog-leg member 62 to deflect cores C toward the aforementioned core destroying zone.

In operation, the aeration machine 10 extracts green aeration cores from the ground G to aerate the soil by plunging hollow tines 17 into the ground to remove the cores in a conventional manner. After the first stroke into the ground, each subsequent stroke of the tine 17 into the ground pushes the previous core upwardly out of the hollow tine 17 where the green core is engaged with a collection brush 29 that guides the green core along a flexible core guide 27 rearwardly into a core destroying mechanism 30. The flexible core guide 27, attached to the front of the tines 17 to follow the elliptical path of the movement of the tines 17 during its operation, and a core retention comb 28, attached to and extending along the back side of the tines 17, keep the ejected cores from falling to the ground before the collection brush 29 can engage the ejected core and convey it rearwardly for further treatment.

When in the normal core destroying mode of operation, the core destroying mechanism 30 includes a series of transverse beater assemblies 31 longitudinally spaced and having pairs of radially offset paddles 33 co-operable with arcuate concave screen members 35 to drag the ejected green cores conveyed rearwardly by the collection brush 29 underneath the beater assemblies 31 to grate against the corresponding screen member 35 in order to separate the earthen material from the root thatch T of the core C. To facilitate the destruction of the cores C, the paddles 33 of the first and second beater assemblies 31 drive the cores C over core destroying fins 39 located at the front of the first screen member 35 and at the juncture of the first and second screen members 35. The gaps between the teeth 34 of the paddles 33 on the first and second beater assemblies 31 are aligned with the core destroying fins 39 at both locations. The longitudinally corresponding paddles 33 on the adjacent beater assemblies 31 are timed to pass through an overlap zone without interference so that the core destroying mechanism 30 will have no dead areas on which pieces of the cores, such as the thatch T, can lodge on the screen 35. As depicted in FIGS. 10a through 10c, each paddle assembly 60 sweeps against the adjacent paddle assembly 60 to clear dirt off the central part of the paddles 60. Accordingly, substantially all surfaces of the core destroying mechanism 30 are live, meaning that there are no dead areas on which major dirt build-ups can occur.

After the cores C have passed through the core destroying mechanism 30, the earthen portion of the cores has been disintegrated into a fine residue that is discharged downwardly through the screen members 35 to be deposited on the ground immediately beneath the core harvesting machine 20. After the core harvesting machine 20 has passed over a section of ground a ground sweeper can be utilized to sweep the discharged residue into the aeration holes created by the removal of the cores by the aeration machine 10. The root thatch portions T are too large to pass through the openings in the screen members 35 and are finally discharged rearwardly by the last beater assembly 31 into a rearwardly disposed thatch collection receptacle 25. The collected thatch portions T can be removed to a selected appropriate remote site and dumped from the thatch receptacle 25 by pivoting the receptacle 25 about its pivotal connection with the frame 21 via a manipulation of the dumping handle 26.

The drive mechanism 40 can also be alternatively configured to effect rotation of the beater assemblies 31 in the opposite direction to that of the core destroying mode to create a core collection mode of operation. In this core collection mode of operation, the intent is to collect the entire green core in the thatch collection receptacle 25 until they can be appropriately disposed at a remote location. By re-configuring the drive belt 41 into a configuration that rotates the beater assemblies 31 to elevate the ejected cores conveyed rearwardly by the collection brush 29, the cores can be conveyed rearwardly over top of the co-rotating beater assemblies 31 until the last beater assembly 31 discharges the pieces of the core C into the thatch receptacle 25. After a sufficient number of cores have been collected, the receptacle 25 can be pivoted to dump the collected cores into a remote location. As one skilled in the art will readily recognize, the instant invention embodied in the core harvesting machine 20 described above can selectively be used to either destroy green cores received directly from an aeration machine 10 or to collect the cores C for subsequent disposal.

The core harvesting machine 20 is designed to be attached to the rear of the aeration mechanism 15 of the aeration machine 10, preferably by attaching the cross frame member 20a of the core harvesting machine 20 to a corresponding cross frame member 14 of the aeration machine 10, so as to be movable therewith. It is the intention of the instant invention to permit the core harvesting machine 20 to be mounted on any aeration machine 10 irrespective of the manufacturer of the machine 10 or the specific configuration thereof. The raising of the aeration mechanism 15 into an inoperative position will de-clutch the drive mechanism 40 of the core harvesting machine 20 to interrupt the operation thereof simultaneously with the inoperative positioning of the aeration mechanism 15. This automatic de-clutching is accomplished by a de-clutching link 18 pinned to the base frame 13 of the aeration machine 10 and to an arcuate pivot member 48 bearing a tensioning idler 47 engageable with the drive belt of the core harvesting machine 20 drive mechanism 40. When the aeration mechanism 15 is raised into an inoperative position, the de-clutching link 18 effects a movement of the tensioning idler 47 away from the drive belt 41 to reduce the tension in the drive belt 41.

The core harvesting machine 20 is not limited in scope to being attached to an aeration machine 10. The core harvesting machine 20 can also be utilized independently of the aeration machine 10 to collect earthen cores deposited on the ground by the aeration machine. The collection brush 29 is capable of lightly sweeping across the surface of the ground to pick-up the earthen cores and convey them rearwardly in either the core destroying mode or the core collection mode, as described in detail above. One skilled in the art will readily realize that the forward portion of the core harvesting machine 20 could be formed as a floating header, such as is taught in U.S. Pat. No. 5,816,336, granted to Kenneth R. Underhill on Oct. 6, 1998, so that the collection brush could follow changing ground undulations to effectively collect the earthen cores from the surface of the ground.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An aeration core harvesting machine comprising:
   a frame adapted for movement over the ground in a direction of travel;
   a core collection device forwardly positioned on said flame to collect earthen aeration cores;
   at least one paddle assembly rotatable about an axis of rotation;
   an arcuate screen member positioned adjacent said at least one paddle assembly to be cooperable therewith, said screen member having holes therein for the passage of dirt therethrough to the ground, said at least one paddle assembly being operable in a core destruction mode wherein said at least one paddle assembly is rotatable about said axis of rotation to receive said aeration cores from said core collection device and to move said aeration cores between said at east one paddle assembly and said screen member for disintegation thereof; and
   a drive mechanism connected to said paddle assemblies to power the rotation thereof.

2. The aeration core harvesting machine of claim 1 further comprising a plurality of said paddle assemblies, said screen member being formed with a series of arcuate segments, each said arcuate segment corresponding to one of said paddle assemblies.

3. The aeration core harvesting machine of claim 2 wherein each said paddle assembly receives the discharge from a preceding paddle assembly to effect disintegration of said earthen aeration cores, except for the paddle assembly adjacent said core collection device which receives said aeration cores from said core collection device.

4. The aeration core harvesting machine of claim 3 wherein each said paddle assembly is formed with opposing paddle members having transversely spaced teeth with gaps therebetween, said teeth being operable to scrub said aeration cores against the corresponding arcuate segment of the screen member to disintegrate said earthen aeration cores.

5. The aeration core harvesting machine of claim 4 wherein the arcuate segment corresponding to the paddle assembly adjacent said core collection device is provided with core destroying fins aligned with said gaps between the teeth of the corresponding paddle members to help disintegrate said earthen aeration cores.

6. The aeration core harvesting machine of claim 5 wherein both of the first two arcuate segments of said screen member spaced longitudinally rearwardly of said core collection device are provided with core destroying fins.

7. The aeration core harvesting machine of claim 1 wherein said at least one paddle assembly is rotatable in a first direction to pass the aeration cores between said at least one paddle assembly and said screen member in a core destroying mode of operation and in a second opposing direction to pass said aeration cores over the top of said at least one paddle to discharge said aeration cores rearwardly of the machine substantially intact in a core collecting mode of operation.

8. The aeration core harvesting machine of claim 7 wherein said drive mechanism is convertible to effect rotation of said at least one paddle assembly in desired one of said first and second directions.

9. The aeration core harvesting machine of claim 8 further comprises a plurality of said paddle assemblies, said screen member being formed with a series of arcuate segments, each said arcuate segment corresponding to one of said paddle assemblies, each of said paddle assemblies having an arc of rotation defined by a tip of said paddle members most radially distant from the corresponding axis of rotation, the arcs of rotation of adjacent paddle assemblies overlapping longitudinally, said drive mechanism being operable to maintain a timing between the paddle members on adjacent said paddle assemblies to prevent said paddle assemblies from interfering.

10. The aeration core harvesting machine of claim 9 wherein said drive mechanism includes a gear drive train interconnecting said longitudinally spaced paddle assemblies to maintain rotational timing therebetween.

11. The aeration core harvesting machine of claim 10 wherein said drive mechanism further includes a flexible drive transmission device operably connected with a source of rotational power and being entrained around a drive member connected to at least one of said paddle assemblies to transfer rotational power thereto.

12. The aeration core harvesting machine of claim 11 wherein said flexible drive transmission member is also entrained around a drive member connected to said core collection device to effect rotation thereof.

13. The aeration core harvesting machine of claim 11 wherein said drive mechanism includes a pair of idler members, said flexible drive transmission member being a drive belt entrained around a first one of said idler members to effect rotation of said paddle assemblies in said first direction in said core destroying mode of operation and entrained around a second one of said idler members to effect rotation of said paddle assemblies in said second direction in said core collecting mode of operation, said drive belt being substantially the same length for operation in both said core destroying mode and said core collecting mode, requiring only a re-orientation of said belt to convert said machine between said modes of operation.

14. The aeration core harvesting machine of claim 13 wherein machine is mounted to an aeration machine to receive aeration cores directly therefrom, said aeration machine being operable to be raised into a non-operative position, said drive mechanism including a link interconnecting said aeration machine and a tensioning mechanism for said drive belt to effect a de-clutching of said drive mechanism when said aeration a machine is placed into said raised non-operative position.

15. The aeration core harvesting machine of claim 14 further comprising a collection receptacle positioned rearwardly of said paddle assemblies to receive a thatch portion of said aeration cores when operating in said core destroying mode and to receive said aeration cores when in said core collecting mode.

16. An aeration core harvesting machine comprising:
  at least one paddle assembly oriented transversely to said direction of travel, said at least one paddle assembly being rotatable about a respective transverse axis of rotation;
  a screen member formed as an arcuate segment positioned adjacent said at least one paddle assembly to be cooperable therewith, said screen member having holes therein for the passage of dirt therethrough to the ground;
  said at least one paddle assembly being formed with opposing paddle members having transversely spaced teeth with gaps therebetween, said teeth being operable to scrub said aeration cores against said arcuate segment of the screen member to disintegrate said earthen aeration cores during rotation of said at least one paddle assembly; and
  said arcuate segment being provided with core destroying fins aligned with said gaps between the teeth of the corresponding paddle members to help disintegrate said earthen aeration cores.

17. The aeration core harvesting machine of claim 16 further comprising:
  a plurality of said paddle assemblies oriented longitudinally of each other;
  a core collection mechanism positioned forwardly of said paddle assemblies to collect earthen aeration cores; and
  said screen member being formed with a plurality of arcuate segments, each of said arcuate segments corresponding to one of said paddle assemblies, the arcuate segment corresponding to the paddle assembly adjacent said core collection device being provided with core destroying fins.

18. The aeration core harvesting machine of claim 17 wherein both of the first two arcuate segments of said screen member spaced longitudinally rearwardly of said core collection mechanism are provided with said core destroying fins.

19. An aeration core harvesting machine comprising:
  a frame adapted for movement over the ground in a direction of travel;
  a core collection device forwardly positioned on said frame to collect earthen aeration cores;
  at least one paddle assembly oriented transversely to said direction of travel and being rotatable about a transverse axis of rotation;
  a screen member positioned adjacent said at least one paddle assembly to be cooperable therewith, said screen member having holes therein for the passage of dirt therethrough to the ground; and
  a drive mechanism connected to said paddle assemblies to power the rotation thereof in a first direction to pass the aeration cores between said paddle assemblies and said screen member in a core destroying mode of operation and in a second opposing direction to pass said aeration cores from one paddle assembly to another over the top of said paddle assemblies to discharge said aeration cores rearwardly of the machine substantially intact in a core collecting mode of operation.

20. The aeration core harvesting machine of claim 19 wherein said drive mechanism further includes a flexible drive transmission device operably connected with a source of rotational power and being entrained around a drive member connected to said at least one of paddle assembly to transfer rotational power thereto.

21. The aeration core harvesting machine of claim 20 further comprising a series of longitudinally spaced transverse paddle assemblies, said drive mechanism including a pair of idler members, said flexible drive transmission member being entrained around a first one of said idler members to effect rotation of said paddle assemblies in said first direction in said core destroying mode of operation and entrained around a second one of said idler members to effect rotation of said paddle assemblies in said second direction in said core collecting mode of operation.

22. The aeration core harvesting machine of claim 21 wherein said flexible drive transmission member is a drive belt, the conversion of said drive mechanism between said core destroying mode of operation and said core collecting mode of operation requiring a re-orientation of said drive belt without requiring a change in the length of said drive belt.

23. The aeration core harvesting machine of claim 19 wherein each of said paddle assemblies have an arc of rotation defined by a tip of said paddle members most radially distant from the corresponding axis of rotation, the arcs of rotation of adjacent paddle assemblies overlapping longitudinally, said drive mechanism being operable to maintain a timing between the paddle members on adjacent said paddle assemblies to prevent said paddle assemblies from interfering.

24. The aeration core harvesting machine of claim 23 wherein each said paddle assembly is formed with opposing paddle members having transversely spaced teeth with gaps therebetween, said teeth being operable to scrub said aeration cores against said screen member to disintegrate said earthen aeration cores during rotation of said at least one paddle assembly, said screen member being provided with core destroying fins aligned with said gaps between the teeth of the corresponding paddle members to help disintegrate said earthen aeration cores.

25. The aeration core harvesting machine of claim 24 wherein said screen member is formed with a plurality of arcuate segments, each of said arcuate segments corresponding to one of said paddle assemblies, the arcuate segment corresponding to the paddle assembly adjacent said core collection device being provided with core destroying fins.

26. The aeration core harvesting machine of claim 25 wherein both of the first two arcuate segments of said screen member spaced longitudinally rearwardly of said core collection mechanism are provided with said core destroying fins.

27. An aeration core processor unit for an aeration core harvesting machine comprising:
   a transverse paddle assembly rotatable about a transverse axis of rotation; and
   an arcuate screen member positioned adjacent said paddle assembly to be cooperable therewith, said screen member having holes therein for the passage of dirt therethrough to the ground,
   said paddle assembly being rotatable to scrub aeration cores between said paddle assembly and said arcuate screen member to disintegrate said aeration core to pass earthen material through said screen member holes.

28. The aeration core processor of claim 27 further comprising a plurality of paddle assemblies, each of said paddle assemblies being positioned longitudinally of any other said paddle assembly, said screen member having a plurality of arcuate segments corresponding to said paddle assemblies and being cooperable therewith to disintegrate aeration cores.

29. The aeration core processor of claim 28 wherein said paddle assemblies are rotatable to receive said aeration cores from a core collection device, each longitudinally subsequent paddle assembly receiving the discharge from a preceding paddle assembly to effect disintegration of said earthen aeration cores.

30. The aeration core processor of claim 29 wherein each said paddle assembly is formed with opposing paddle members having transversely spaced teeth that scrub said aeration cores against the corresponding arcuate segment of the screen member to disintegrate said earthen aeration cores.

31. The aeration core processor of claim 30 wherein each said paddle member is formed with a bent member having a mounting portion and an angled portion trailing said mounting portion during rotation of said paddle assemblies to destroy said earthen cores in said core destroying mode of operation, said angled portions forcing said earthen aeration cores into said arcuate screen member as said paddle assemblies are rotated, said teeth being formed in said angled portion.

32. The aeration core processor of claim 31 wherein the arcuate segment corresponding to a first of said paddle assemblies to receive said earthen cores for processing is provided with core destroying fins aligned with gaps between the teeth of the corresponding paddle members to help disintegrate said earthen aeration cores.

33. The aeration core processor of claim 32 wherein both of the arcuate segments corresponding to the first two of said paddle assemblies to process said earthen aeration cores are provided with core destroying fins.

34. A method of harvesting aeration cores comprising the steps of:
   a. collecting said aeration cores with a core collection device;
   b. processing said aeration cores with a rotary mechanism including at least one paddle assembly being rotatable about said axis of rotation to receive said aeration cores from said core collection device, said rotary mechanism being operable in a core destruction mode in which said aeration cores are guided between said at least one paddle assembly and a screen member such that said processing step a disintegration of said aeration cores between said at least one paddle assembly and said screen member to create a remnant aeration core material; and
   c. discharging said remnant aeration core material from said rotary mechanism.

35. The method of claim 34 wherein said processing step includes the step of:
   scrubbing said aeration cores between said rotary mechanism and a screen member.

36. The method of claim 35 wherein said scrubbing step includes the steps of:
   a. receiving said aeration cores from said core collection device;
   b. first scrubbing said aeration cores between a first paddle assembly and a corresponding portion of said screen member to create a partially disintegrated aeration core material;
   c. passing said partially disintegrated aeration core material from said first paddle assembly and to a second paddle assembly; and
   d. further scrubbing said partially disintegrated aeration core material between said second paddle assembly and a corresponding portion of said screen member to create further disintegrated aeration core material.

37. The method of claim 36 wherein said scrubbing step further includes the steps of:
   a. passing said further disintegrated aeration core material from said second paddle assembly to a third paddle assembly; and
   b. still further scrubbing said further disintegrated aeration core material between said third paddle assembly and a corresponding portion of said screen member.

38. The method of claim 37 wherein said discharging step occurs during each of said first scrubbing, further scrubbing and said still further scrubbing steps.

39. The method of claim 38 wherein said discharging step includes the step of:
   passing earthen material through said screen member to the ground, said method further comprising the step of:
   discarding said remnant aeration core material from said third paddle assembly, said remnant aeration core material being substantially an organic thatch portion of said aeration cores.

40. The method of claim 39 wherein said discarding step includes the step of:
   receiving said remnant aeration core material in a collection vessel.

41. The method of claim 34 wherein said rotary mechanism is operable in a core collecting mode in which said processing step includes the step of:
   conveying said aeration cores over top of said at least one paddle assembly without substantial disintegration therof, said remnant aeration core material being substantially the entire aeration core.

42. The method of claim 34 wherein said collecting step includes the step of:

receiving said aeration cores directly from an aeration machine creating said aeration cores.

43. The method of claim 34 wherein said collecting step includes the step of:

picking up said aeration cores from the surface of the ground.

* * * * *